United States Patent [19]
Gof

[11] 3,791,332
[45] Feb. 12, 1974

[54] WATER BIKE
[76] Inventor: Mohammed S. Gof, 89 Haledon Ave., Paterson, N.J. 07522
[22] Filed: June 1, 1971
[21] Appl. No.: 148,526

[52] U.S. Cl.................................... 115/27, 115/2
[51] Int. Cl........................................... B63h 16/00
[58] Field of Search..................... 115/25–27, 2, 23

[56] References Cited
UNITED STATES PATENTS
| 3,640,239 | 2/1972 | Petroskey | 115/27 |
| 75,531 | 3/1868 | Crossley | 115/23 |
| 535,623 | 3/1895 | Klein | 115/29 |
| 1,992,913 | 2/1935 | Hayden | 115/2 |

Primary Examiner—George E. A. Halvosa
Assistant Examiner—Sherman D. Basinger
Attorney, Agent, or Firm—James J. Cannon

[57] ABSTRACT

A vehicle in the form of a water bicycle for use either over land or water, which comprises the combination of a pair of passenger-carrying side boats operably connected with a centrally disposed bicycle member that provides the necessary driving force to propel the vehicle over land and water and alternatively, a single passenger-carrying boat propelled by a bicycle centrally disposed therein.

2 Claims, 8 Drawing Figures

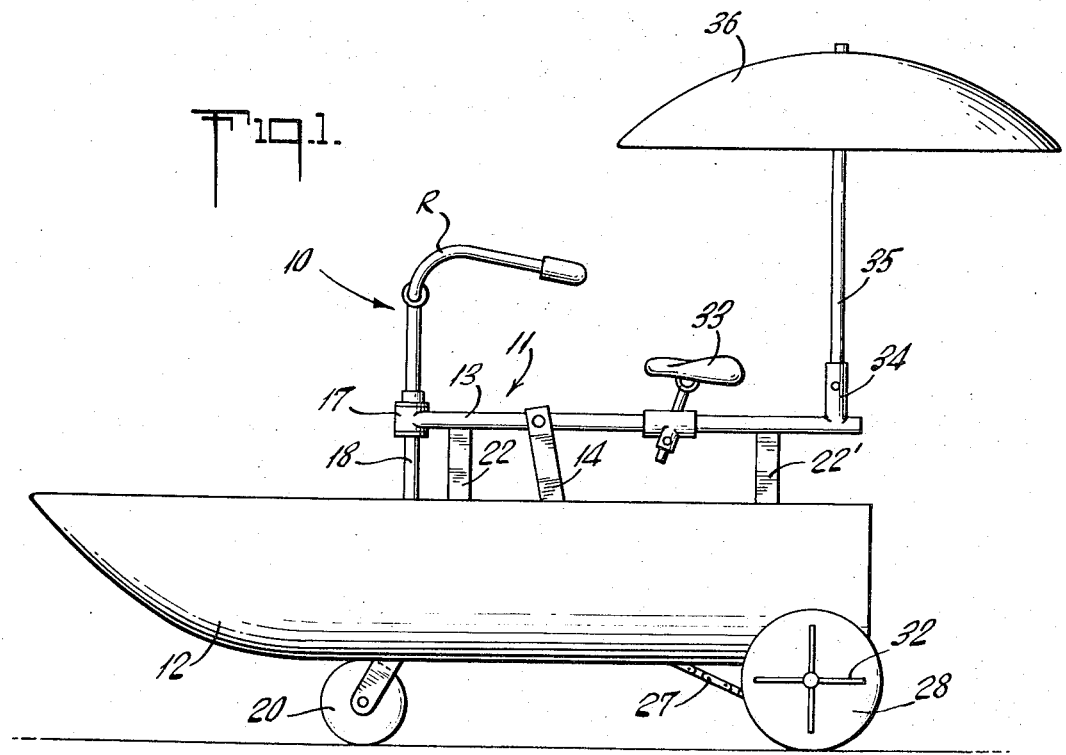
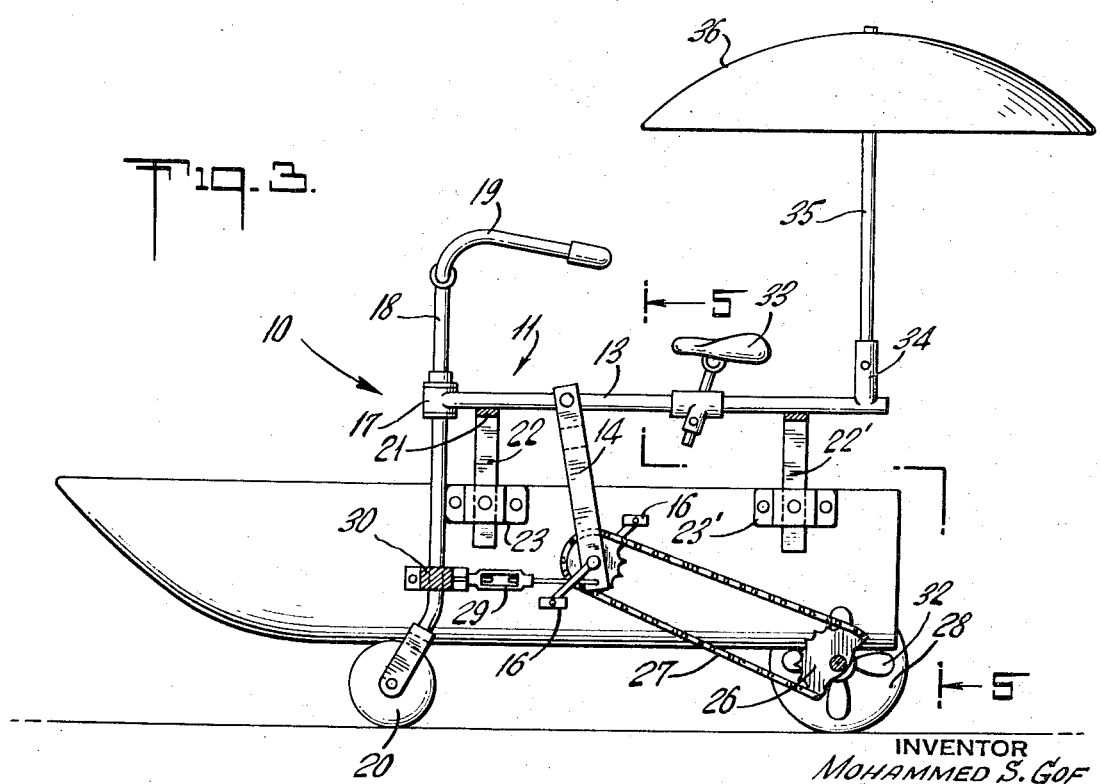

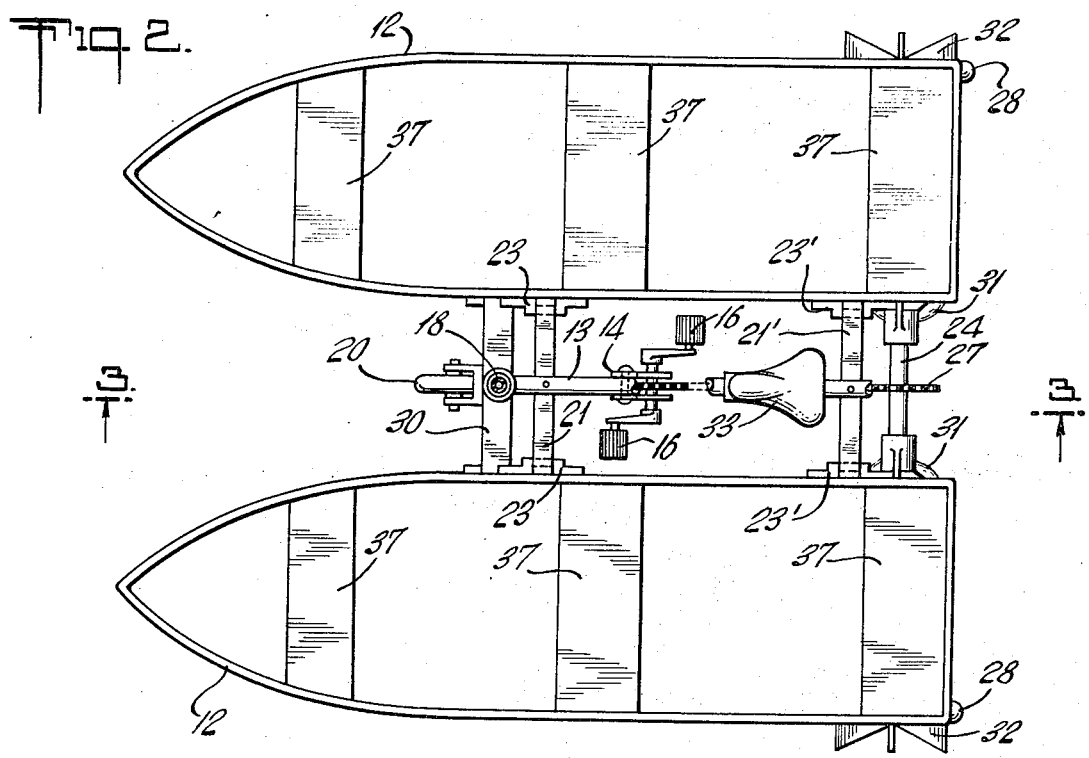
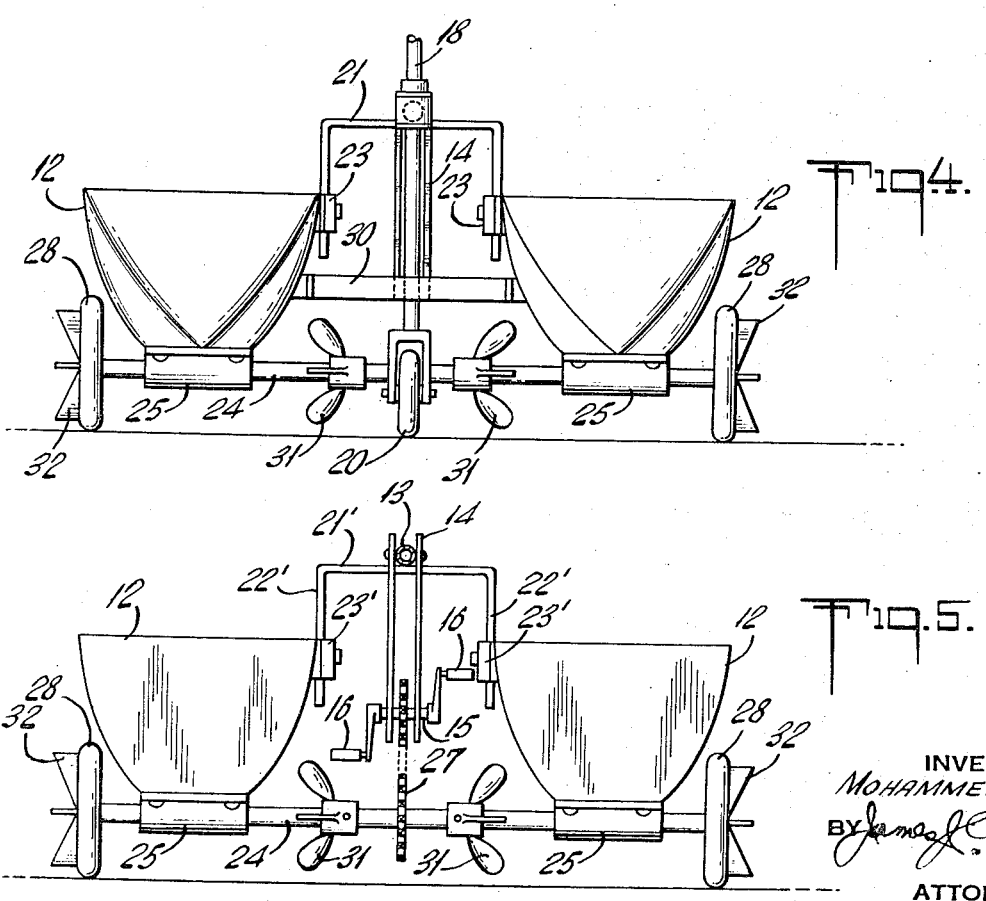

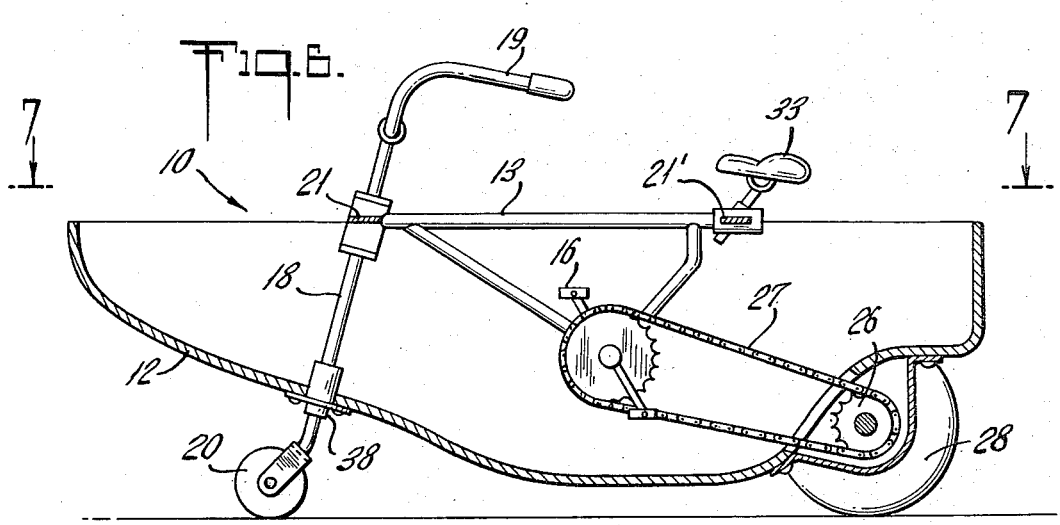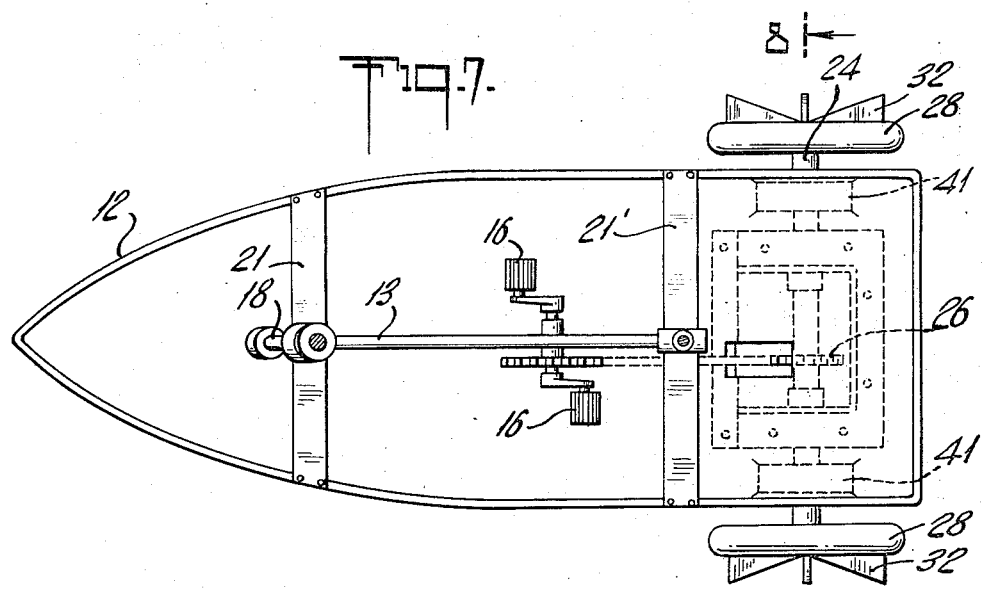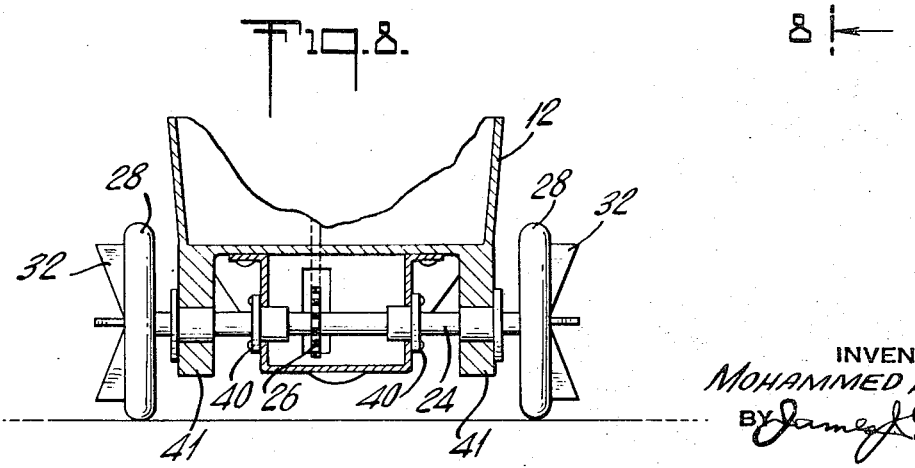

WATER BIKE

BACKGROUND OF THE INVENTION

Heretofore bicycles capable of use over land and water have had serious deficiencies in that they have been capable of use by a single person only and are relatively dangerous in that they are not properly balanced to prevent toppling. Also, the float members of such prior art bicycles normally are incapable of use for carrying people and further, to transport these bicycles on land it generally is necessary to use a separate vehicle such as a car to pull the bicycle.

SUMMARY OF THE INVENTION

The present invention provides a novel and improved construction for a water bicycle which is capable of carrying a number of persons by utilization of a pair of side boats or a single boat as well as the bicycle seat and also readily is driven on land as well as water. Toward this end in one preferred embodiment there is provided a water bicycle comprising a pair of laterally spaced side boats interconnected by means of a common drive shaft that operably is connected with the drive chain of a bicycle centrally disposed of the boats. The shaft is supported at either end by a wheel. Along the drive shaft there are provided a plurality of propellers which cause the water bicycle to be propelled on water. The bicycle is provided with the usual steering shaft having connected thereto at the bottom a wheel and at the top handle bars to enable the operator to steer the water bike. An alternate arrangement comprises the bicycle centrally disposed of a single boat capable of carrying passengers. The present invention provides a novel construction and combination of parts as will be hereinafter described in greater detail, which overcomes the foregoing outlined deficiencies of like prior art constructions and more as will be apparent from the following description.

Accordingly, it is a primary object of the present invention to provide a novel and improved vehicle in the form of a bicycle that is capable of carrying passengers and is adapted for operation either over land or water.

This and other objects of the invention will be achieved by virtue of the presently disclosed novel construction and arrangement, with specific reference being made to the drawings wherein the invention is illustrated.

BRIEF DESCRIPTION OF THE DRAWINGS

FIG. 1 is a side elevational view of a water bicycle in accordance with the present invention;

FIG. 2 is a partial top plan view thereof;

FIG. 3 is a cross-sectional view taken along the line 3—3 of FIG. 2;

FIG. 4 is a rear plan view of the invention;

FIG. 5 is a cross-sectional view taken along the line 5—5 of FIG. 3;

FIG. 6 shows a side view of an alternate embodiment;

FIG. 7 is a top view taken along the line 7—7 of FIG. 6; and

FIG. 8 is a partial cross-sectional view taken along the line 8—8 of FIG. 7.

DESCRIPTION OF THE PREFERRED EMBODIMENTS

Having reference now to the drawings wherein like parts are designated by the same reference numerals, there is shown in FIG. 1 a vehicle 10 comprising a bicycle generally designated 11 centrally disposed between a pair of side boats 12. The bicycle 11 includes a horizontal support rail 13 to which is secured a pair of laterally spaced parallel downward extending pedal support bars 14. A pedal shaft 15 is journaled at the bottom end of the bars 14 and is fixed to a pedal sprocket for movement therewith. At either end of the pedal shaft 15 is a pedal 16 adapted to be operated in the usual manner. The forward portion of the horizontal rail 13 is provided with a bored collar 17 which receives for universal movement a vertical steering shaft 18. A pair of steering handles 19 are connected in a conventional manner to the upper end of the shaft 18 and at its lower end the shaft carries a steering wheel 20 that will cause the vehicle to move in accordance with the movement of the handle bars 19 by the operator. The rail 13 is connected at its forward end to the side boats 12 by means of a U-shaped cross-bar 21. The vertical portions 22 of the cross-bar 21 are secured conventionally by nuts and bolts to the brackets 23 which are in turn fastened to the inner sides of the boats 12. The vertical legs 22 may be constructed to permit vertical adjustment of the rail 13. At the rear of the rail 13 there is provided a similar second U-shaped cross-bar 21' having its vertical legs 22' secured in brackets 23' that are fastened to the side boats 12. As in the case of the forward rail support members, the rear rail support bracket 21' is vertically adjustable.

At the rear on the bottom of the side boats there is provided a common laterally extending horizontal drive 24 journaled for free rotation in a pair of elongated hollow members 25 which are secured to the underside of the boats. These members contain suitable bushings or bearings to permit free rotation of the shaft. A sprocket 26 is centrally fixed on the drive shaft 24 and is connected to the pedal drive by an endless chain 27 such that as the operator turns the pedals the shaft 24 will rotate in the direction of pedal movement. At either end of the shaft 24 there is provided a large wheel 28. Alternatively, the wheels 28 can be located adjacent the inner side of the boats instead of being disposed on the outer side as shown. To facilitate adjustment of tautness of the chain there is provided suitable means 29 in the form of a tightening bolt connected at one end to the support bars 14 and at the other end to a bottom cross bar 30 which has journaled therethrough the steering shaft or post 18. The cross-bar 30 is secured at its ends to the side boats directly or to brackets which may be similar to the brackets 23 and 23' which extend downward from the boat and permit vertical adjustment of the cross-bar 30.

To facilitate movement of the vehicle over water there are provided a plurality of propellers 31 suitably affixed to the shaft 24 on either side of the drive sprocket 26 for movement therewith. Additional propellers may be provided on the shaft to provide further propulsion when traveling over water as shown by a second set of propellers 32 integrally connected to or formed with the rear wheels 28.

A vertically adjustable seat 33 is provided between the extremities of the rail 13, being slightly disposed to the rear of the pedals 16. Also, at the rear end of the support rail 13 there may be provided an upward extending tubular member 34 that is adapted to receive the handle 35 of an umbrella 36, which will protect the operator from the sun or rain.

As shown in FIG. 2 each side boat 12 is provided with a plurality of seats 37 that allows the vehicle to carry a number of people. To further support the front end of the water bike there may be provided additional front wheels (not shown) located beneath the front of the boats. These wheels would be smaller than the rear wheels 28 and would be secured to the boat's underside while being connected for turning movement with the main central steering wheel 20.

FIGS. 6 through 8 illustrate an alternate embodiment of the present invention wherein a single boat 12 only is employed with the bicycle 11 being disposed substantially centrally of the boat sides. The bicycle, as shown, is connected to the boat 12 in substantially the same manner as in the embodiment shown in FIGS. 1 through 5. The steering shaft 18 extends through an opening formed in the forward portion of the boat's floor. To prevent water from seeping into the boat there is provided a suitable waterproof connection designated 38 wherein the shaft 18 is journaled. At the rear or stern of the boat the driven gear 26 is housed in a waterproof gear box or casing 39. The casing 39 is secured to the underside of the boat 12 in a watertight manner and is provided in each of its side walls with a bearing 40. The driven shaft 24 is journaled in these bearings 40 and has secured at opposite ends thereof wheels 28 having propellers 32 associated therewith. The bearings 40 are designed so as to prevent any seepage of water into the casing 39. A second pair of bearing members 41 are secured at either side of the boat as shown in FIG. 8. These bearing members either may be integrally formed with the underside of the boat as shown or may be separate therefrom and connected by means of bolts, welding or the like. The driven shaft 24 also is journaled in the bearing members 41.

Although there has been disclosed a preferred embodiment of my invention, it is apparent that various modification and/or additions thereto can be made. For example, if it is desired to take a sun bath, an accessory board may be provided that can be secured laterally across the rear or front of the boats. Alternatively, a door complementary to the top of the boat could be hinged at the outer top edge of the boats. This door then could be swung up to cover the top of the boats and be functional for sunbathing or for providing a cover for the boats which then could be used to store equipment and the like.

Having thus described the nature of my invention, what I claim is as follows:

1. A vehicle adapted for use over land and water comprising at least one boat formed by a bottom having a continuous upwardly extending sidewall therearound forming a hull, said hull having a converging bow and a substantially square stern, said bottom extending upwardly at its bow and stern, a bicycle frame, disposed within said hull, means in said hull fixedly supporting said bicycle frame upright to said hull, steering means carried by said bicycle frame and said hull at the forward portion of said hull near said bow, a wheel operatively connected to said steering means and positioned below the forward exterior portion of said bow, a shaft extending laterally of, below and rotatably carried by the exterior of the hull adjacent the stern, wheels operatively connected to said shaft and positioned on opposite sides of and extending below the exterior stern of the hull, propellers operatively carried by said shaft and driving means connected to said shaft and to said bicycle frame, and a water tight casing secured to the exterior of the stern with said driving means operatively connected in said casing to said shape.

2. The vehicle of claim 1 wherein said driving means comprises a bicycle sprocket and pedals on said frame inside said hull and another sprocket in said casing with an endless chain carried by said sprockets.

* * * * *